United States Patent
Donderici et al.

(10) Patent No.: US 9,869,172 B2
(45) Date of Patent: Jan. 16, 2018

(54) DOWNHOLE MULTI-PIPE SCALE AND CORROSION DETECTION USING CONFORMABLE SENSORS

(71) Applicant: Halliburton Energy Services, Inc., Houston, TX (US)

(72) Inventors: Burkay Donderici, Houston, TX (US); Neeraj Sethi, Gurgaon (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/915,825

(22) PCT Filed: Sep. 30, 2014

(86) PCT No.: PCT/US2014/058182
§ 371 (c)(1),
(2) Date: Mar. 1, 2016

(87) PCT Pub. No.: WO2015/050840
PCT Pub. Date: Apr. 9, 2015

(65) Prior Publication Data
US 2016/0194948 A1 Jul. 7, 2016

(30) Foreign Application Priority Data
Oct. 3, 2013 (IN) .......................... 2932/DEL/2013

(51) Int. Cl.
*G01V 3/00* (2006.01)
*E21B 47/00* (2012.01)
(Continued)

(52) U.S. Cl.
CPC .......... *E21B 47/00* (2013.01); *E21B 47/0905* (2013.01); *G01V 3/26* (2013.01)

(58) Field of Classification Search
CPC . G01V 1/48; G01V 1/50; G01V 1/368; G01V 3/30; G01V 3/38; G01V 3/18;
(Continued)

(56) References Cited

U.S. PATENT DOCUMENTS 4,292,588 A 9/1981 Smith
4,292,589 A 9/1981 Bonner
(Continued)

OTHER PUBLICATIONS

International Search Report and Written Opinion issued in related PCT Application No. PCT/US2014/058182 dated Jan. 8, 2015, 16 pages.
(Continued)

*Primary Examiner* — Minh N Tang
(74) *Attorney, Agent, or Firm* — Scott Richardson; Baker Botts L.L.P.

(57) ABSTRACT

An example method for making downhole measurements may include positioning a tool with a conformable sensor within a pipe in a borehole in a subterranean formation, and generating a first electromagnetic signal using at least one of a plurality of transmitters of the conformable sensor. A first response to the first electromagnetic signal may be measured using at least one of a plurality of receivers of the conformable sensor. At least one of a scale parameter, a pipe parameter, and a stand-off distance between the conformable sensor and the pipe may be determined using the first response.

18 Claims, 9 Drawing Sheets

(51) Int. Cl.
*E21B 47/09* (2012.01)
*G01V 3/26* (2006.01)

(58) Field of Classification Search
CPC .......... G01V 3/26; G01V 3/28; G01N 27/902;
G01N 27/904; G01N 27/9046; E21B
47/0006; E21B 47/00; E21B 47/0002;
E21B 47/18; E21B 47/082
See application file for complete search history.

(56) References Cited

U.S. PATENT DOCUMENTS

| | | | | |
|---|---|---|---|---|
| 4,916,400 | A | * | 4/1990 | Best .................... G01V 3/30 175/40 |
| 5,237,271 | A | * | 8/1993 | Hedengren ........ G01N 27/9046 324/232 |
| 5,869,767 | A | | 2/1999 | Hayward et al. |
| 7,420,367 | B2 | * | 9/2008 | Bespalov ............ E21B 47/0002 324/303 |
| 9,310,338 | B2 | * | 4/2016 | Yarbro ................. E21B 47/082 |
| 2002/0062992 | A1 | | 5/2002 | Fredericks et al. |
| 2002/0167418 | A1 | | 11/2002 | Goswami et al. |
| 2012/0095686 | A1 | * | 4/2012 | Legendre ............. E21B 47/082 702/6 |

OTHER PUBLICATIONS

Goldfine, Neil, "Surface-Mounted Eddy-Current Sensors for On-Line Monitoring of Fatigue Tests and for Aircraft Health Monitoring", Second Joint NASA/FAA/DoD Conference on Aging Aircraft, Aug. 1998.

Goldfine, Neil, et al, "Conformable Eddy-Current Sensors and Arrays for Fleetwide Gas Turbine Component Quality Assesment", ASME Journal of Engineering for Gas Turbines and Power, vol. 124, No. 4, pp. 904-909, Oct. 2002.

Goldfine, Neil, "MWM-Array Eddy Current Sensors for Detection of Cracks in Regions with Fretting Damage", Materials Evaluation, ASNT, Jul. 2002, vol. 60, No. 7.

International Preliminary Report on Patentability issued in related Application No. PCT/US2014/058182, dated Apr. 14, 2016 (13 pages).

* cited by examiner

DOWNHOLE MULTI-PIPE SCALE AND CORROSION DETECTION USING CONFORMABLE SENSORS

CROSS REFERENCE TO RELATED APPLICATIONS

The present application is a U.S. National Stage Application of International Application No. PCT/US2014/058182 filed Sep. 30, 2014, and claims priority to Indian provisional number 2932/DEL/2013, filed Oct. 3, 2013, titled "Downhole Multi-Pipe Scale and Corrosion Detection using Conformable Sensors," both of which are incorporated herein by reference in their entirety for all purposes.

BACKGROUND

The present disclosure relates generally to downhole drilling operations and, more particularly, to downhole multi-pipe scale and corrosion detection using conformable sensors. The present disclosure relates generally to downhole drilling operations and, more particularly, to downhole inspection with ultrasonic sensor and conformable sensor responses. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain operations, measurements of downhole elements within the wellbore may be generated, including measurements of a casing within the wellbore. Typically, those measurements are limited with respect to their granularity, and small features within the wellbore may not be identifiable through the measurements. Moreover, the casing can interfere with measurements intended to identify elements outside of the casing.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to multi-pipe scale and corrosion detection using conformable sensors.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple," "coupled," or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 11:
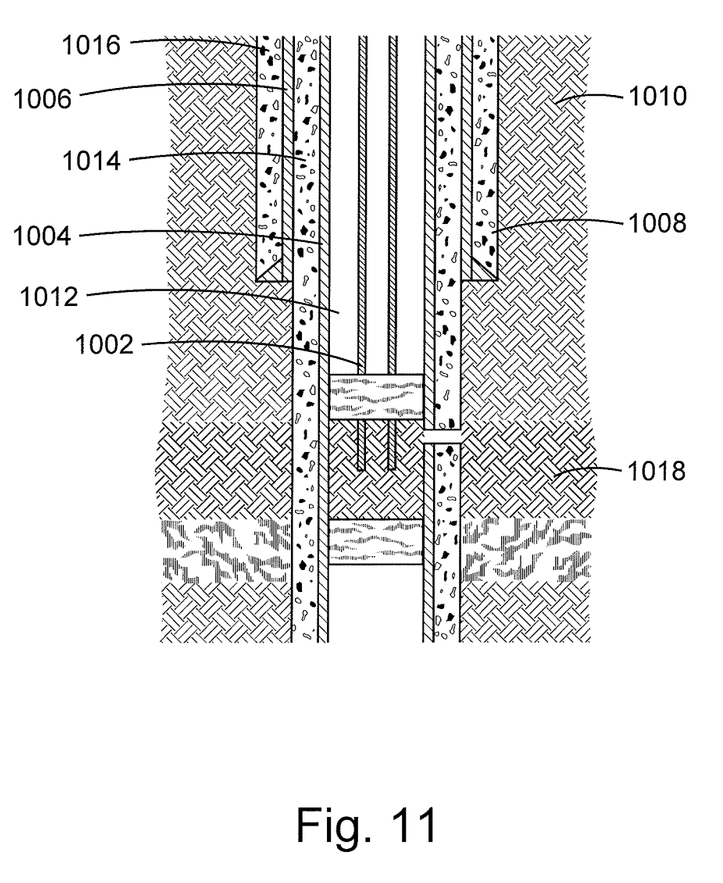
FIG. 11 is a diagram showing an example production environment with multiple, concentric pipes.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casing, may be secured within the borehole as part of the hydrocarbon recovery operation, serving numerous purposes, including preventing the wellbore from collapsing after it is drilled, protecting the water table from contamination, and maintaining pressure within the borehole, and providing a conduit through which hydrocarbons may flow to the surface. FIG. 11 is a diagram showing an example production environment and illustrates casings 1002, 1004, and 1006 disposed within a borehole 1008 in a rock formation 1010. The casings 1002-1004 may be concentric or nearly concentric and secured within the borehole 1008 and each other through cement layers 1012, 1014, and 1016. The center casing 1002 may comprise a production casing where hydrocarbon from the formation strata 1018 is received at the surface (not shown). In certain instances, scale or mineral deposits may build-up on a production casing, reducing the interior diameter through which hydrocarbons may flow to the surface. Additionally, downhole temperature, pressure and chemical conditions may cause one or more of the casings to corrode.

According to aspects of the present disclosure, a downhole tool with at least one conformable sensor may be placed downhole proximate to the casing to identify and measure the scale on the casing as well as other casing parameters. As used herein, conformable sensors may comprise planar sensors that are printed or disposed on a material that can conform to the shape of a surface with which it is in contact and may produce high resolution, azimuthally sensitive measurements that can be used to visualize that surface. As will be described below, an example downhole tool with conformable sensors may provide a high resolution, azimuthally accurate image of scale build-up and corrosion within multiple concentric downhole casings.

Figure 1:
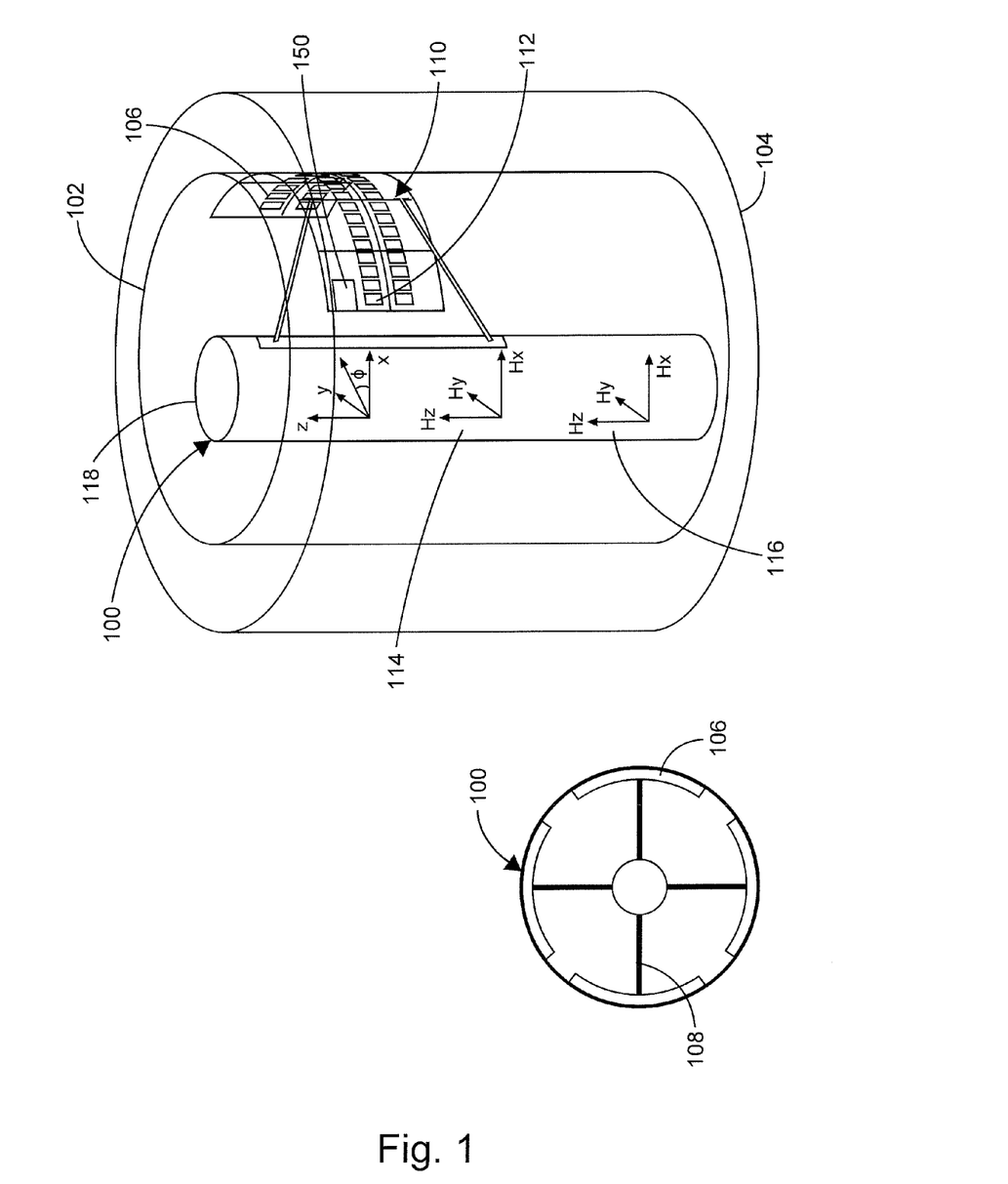
FIG. 1 is a diagram showing an example downhole tool with conformable sensors, according to aspects of the present disclosure.

FIG. 1 is a diagram that shows two views of an example downhole tool 100 with at least one conformable sensors 112, according to aspects of the present disclosure. The downhole tool 100 is shown deployed in concentric pipes 102 and 104, such as in a cased environment. In certain embodiments, the downhole tool 100 may comprise a wireline survey or measurement tool that can be introduced into an open hole (non-cased) environment, a cased environment, or within the bore of a drill string in a conventional drilling assembly. In certain embodiments, the downhole tool 100 may be included in a LWD/MWD segment of a bottom hole assembly (BHA) in a conventional drilling assembly. The tool 100 may be physically and/or communicably coupled to a control unit (not shown) at the surface through a wireline or slickline, or any other conveyance, or through a downhole telemetry systems, such as a mud pulse telemetry system. The tool 100 may also comprise a control unit that is communicably coupled to the conformable sensor 112 of the tool. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one conformable sensor 112 may be coupled to a tool body 118 of the downhole tool 100. The conformable sensor 112 may include a primary winding having extended portions for creating an electromagnetic (EM) field in a target, in this case the pipe 102, and secondary windings within the primary winding for measuring the current response of the target to the generated EM field. The measured current response may be processed to identify physical parameters of the target, as will be described below. The resolution of the measurements taken by the conformable sensor 112 may increase as the "stand-off" distance between the sensor 112 and the target decreases.

In the embodiment shown, the conformable sensor 112 is one of an array of conformable sensors 110 disposed on a pad 106 that is coupled to and extendable from the tool body 118 through spring mechanisms or motorized arms 108 to contact the pipe 102. When the arms 108 are extended, the conformable sensor 112 may contact the pipe 102. Other locations and arrangements for the conformable sensor 112 are possible and will be described below. Other type of sensors, such as acoustic sensor 150, may be coupled to the pad 106. The elasticity of the pad 106 and tension in the arm 108 may be designed in such a way that the pad 106 will substantially deform to the shape of the pipe 102, which may increase the resolution of the resulting measurements. Any scale build-up on the pipe 102 will affect the contact between the pad 106 and the pipe 103, resulting in an increased or non-uniform "stand-off" distance between the conformable sensor 112 and the pipe 102. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and/or other stations cover other sets, providing full coverage.

As stated above, the conformable sensor 112 may include at least one portion that functions as a transmitter to generate electromagnetic (EM) fields in a target, such as the pipe 102, and at least one portion that functions as a receiver that receives and/or measures the current responses of the target to the generated EM fields. In certain embodiments, the downhole tool 100 may comprise separate transmitters 114 or receivers 116 mounted on the tool body 118. These additional transmitters 114 or receivers 116 may be inductive-type antennas, realized with coils, solenoids, or rotating and/or moving magnets. In certain embodiments, EM fields may be generated and the corresponding current responses measured with any combination of the transmitter 114, the receiver 112, and the transmitters and receivers within the conformable sensor 112. Notably, when the transmitter is farther away from the receiver, the depth of investigation increases but the measurement resolution decreases. Higher depths of investigation may be used to generate measurements corresponding to elements away from the downhole tool 100, such as the pipe 106.

In use, the downhole tool 100 may generate high resolution measurements of the pipe 102 by placing the pad 106 in contact with the pipe 102 and transmitting a time-varying EM signal from a transmitter of the conformable sensor 112. The signal may excite eddy currents in the pipe 102 and in and scale along the pipe 102. The eddy currents may generate secondary currents that contain information about the pipe 102 and scale and about the stand-off distance between the conformable sensor 112 at the pipe 102. The secondary currents may be measured at some or all of the receivers of the conformable sensor 112. Conversely, the downhole tool 100 may generate low-resolution measurements of the pipe 104 by transmitting a time-varying EM signal from transmitter 114 and measuring the current response of the pipe 104 at one or more receivers of the conformable sensor 112.

Figure 2:
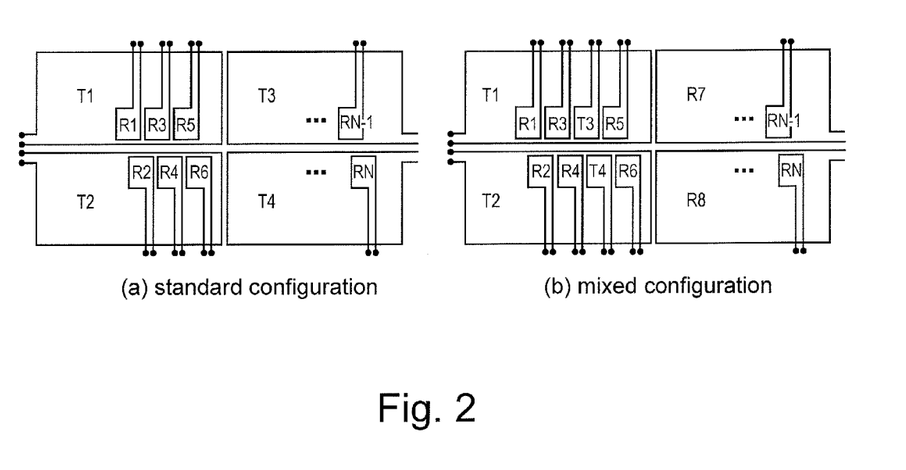
FIG. 2 is a diagram showing two example antenna windings for a conformable sensor, according to aspects of the present disclosure.

FIG. 2 is a diagram showing two example antenna windings for a conformable sensor, according to aspects of the present disclosure. In configuration (a), the windings include transmitters T1-T4 and staggered receivers R1-RN, with the area of the transmitters T1-T4 larger than the area of the receivers R1-RN. The transmitters T1-T4 may comprise primary windings, while the staggered receivers R1-RN may comprise secondary windings. The number and size of the receiver pairs may determine the granularity and resolution of the measurements. Staggering the receivers may double the azimuthal resolution of the sensor since more measurements are made per azimuthal position. In configuration (b), the windings also include transmitters T1-T4 and receivers R1-RN, but the transmitters T1-T4 and receivers R1-RN may be mixed with regard to their size and relative configurations. Configuration (b) may produce more spatially diverse information with varying resolution, depths of investigation and signal levels. Other embodiments may comprise different sizes, shapes, numbers and orientations of the transmitters T1-T4 and receivers R1-RN.

The windings in both configuration (a) and configuration (b) may comprise the windings for a single conformable sensor, formed by circuit printing or other deposition methods on a flexible surface (not shown). In certain embodiments, an array of conformable sensors may be formed using multiple individual sensors on separate flexible surfaces, or by printing or disposing an array of individual sensor windings on one flexible surface. Ports of the transmitting and receiving windings (shown as circles) may be electrically connected to transmitter and receiver boards (not shown) that cause the transmitters T1-T4 to generate signals and cause the receivers R1-RN to measure the current responses caused by the generated signals. In certain embodiments, one or more of the transmitters T1-T4 may generate a signal in a target, and each of the receivers R1-RN may separately measure the response of the target to the signal. In certain embodiments, the combinations of transmitters and receivers used to generate EM signals and measure current responses may be varied dynamically by a control unit coupled to the transmitters T1-T4 and receivers R1-RN. The number and size of the receiver pairs may determine the granularity and resolution of the measurements.

Figure 3:
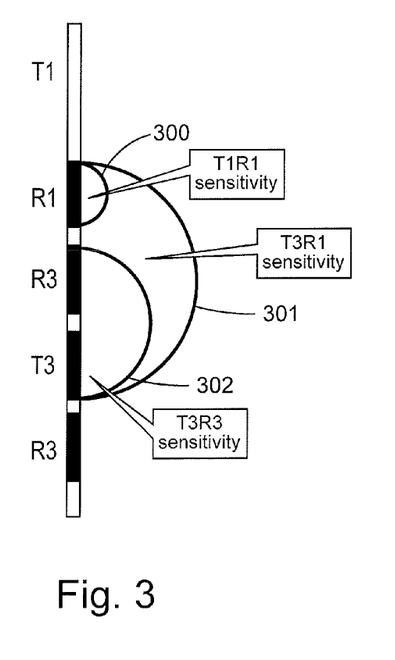
FIG. 3 is a diagram illustrating different depths of investigation for combinations of transmitters and receivers, according to aspects of the present disclosure

As described above, the distance between the transmitter and the receiver may affect the resolution of the resulting measurement and the depth of investigation covered by that measurement. FIG. 3 is a diagram illustrating different depths of investigation for combinations of transmitters and receivers on a conformable sensor, according to aspects of the present disclosure. As can be seen, FIG. 3 illustrates two transmitters T1 and T3 and three receivers R1, R3, and R5. The arrangement of the transmitters T1 and T3 and three receivers R1, R3, and R5 may correspond to configuration (b) in FIG. 2, with the windings for transmitter T3 and receivers R1, R3, and R5 located within the winding of transmitter T1.

The curved lines extending from the transmitters and receivers show the depths of investigation for select transmitter and receiver pairs, with the size of the curved lines depending on the distance between the transmitter and the receiver. Curved line 300 shows the depth of investigation for a measurements taken using the transmitter T1 and the receiver R1. Curved line 301 shows the depth of investigation for a measurements taken using the transmitter T3 and the receiver R1. Curved line 302 shows the depth of investigation for a measurements taken using the transmitter T3 and the receiver R2. Notably, the depth of investigation for a transmitter and receiver pair increases with the distance between the pair, but because the increased depth of investigation increases the area or volume that must be measured, the resolution of the resulting measurement decreases.

As can be seen, the curved line 300 extends the smallest distance from the transmitters and receivers, indicating the smallest depth of investigation and the highest resolution out of the three select transmitter and receiver pairs. This is because the distance between the receiver R1 and transmitter T1 is negligible due to the overlapping windings, leading to an localized, high resolution measurement. Curved line 301 is the largest, in contrast, because the distance between the transmitter T3 and the receiver R1 is the largest. The resulting measurement will also have the lowest resolution.

In practice the conformable sensor containing the transmitters T1 and T3 and receivers R1, R3, and R5 may be pressed against a first casing, in contact with scale on the casing. Measurements taken using the transmitter T1 and the receiver R1 may provide high resolution information on the closest target, for example, scale on a pipe. Measurements taken using the transmitter T3 and the receiver R1 and transmitter T3 and the receiver R3 may provide lower resolution images of the scale, but may provide additional information of elements behind the scale, such as a production casing. Additionally, measurements taken using the transmitter T3 and the receiver R1 may provide information of elements remote from the conformable sensor, such as a concentric casing outside of the production casing. As will be described below, the measurements from the different transmitter and receiver pairs may be captured and processed to resolve the different measurements and separate separately image scale and pipe features.

Figure 4:
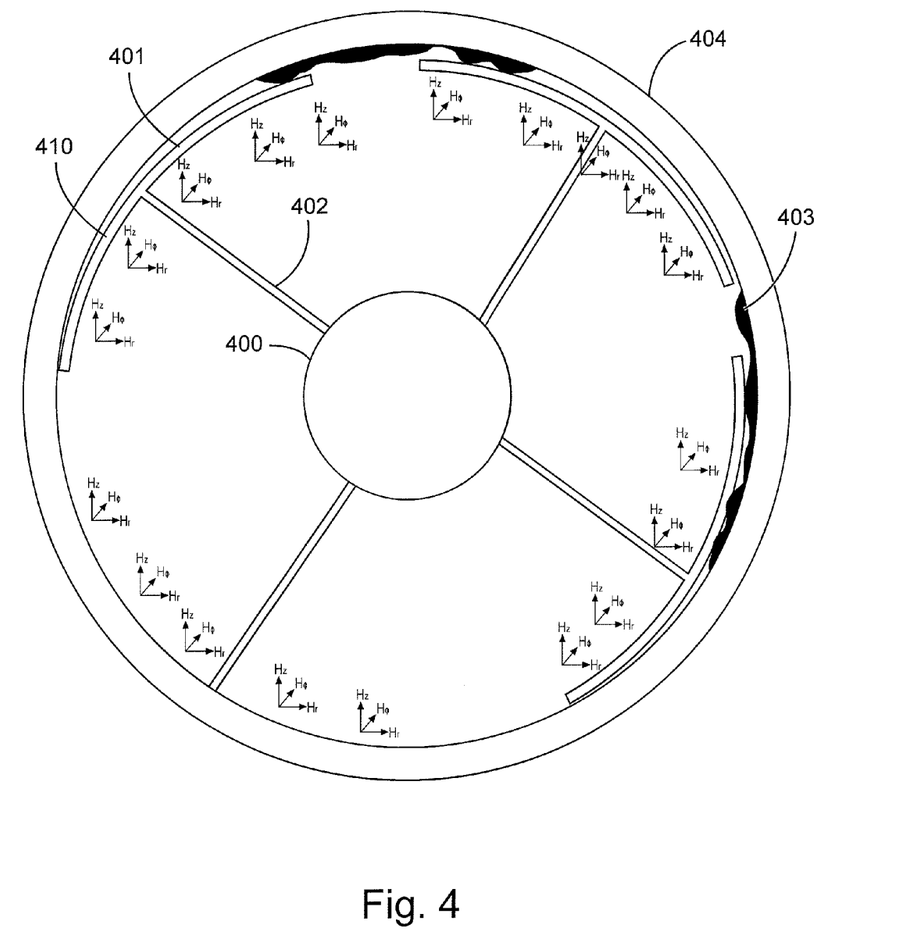
FIG. 4 is a diagram illustrating an example downhole tool with conformable sensors in contact with a casing, according to aspects of the present disclosure

FIG. 4 is a diagram illustrating an example downhole tool 400 with conformable sensors in contact with a casing, according to aspects of the present disclosure. The downhole tool 400 may comprise pads 401 with conformable sensors 410 on extendable arms 402 that are in contact with scale 403 on a casing 404. Due to the presence of the scale 403 on the casing 404, certain conformable sensors 410 may have a different stand-off with respect to scale 403 or casing 404. According to aspects of the present disclosure, the measurements captured from the conformable sensors 410 may be processed to determine scale and pipe properties as well as pipe stand-off. However, as can be seen in the figure, due to a single set of pads not being able to have 360 degrees coverage, a portion of the scale (see top portion of the figure) may not be imaged.

Figure 5:
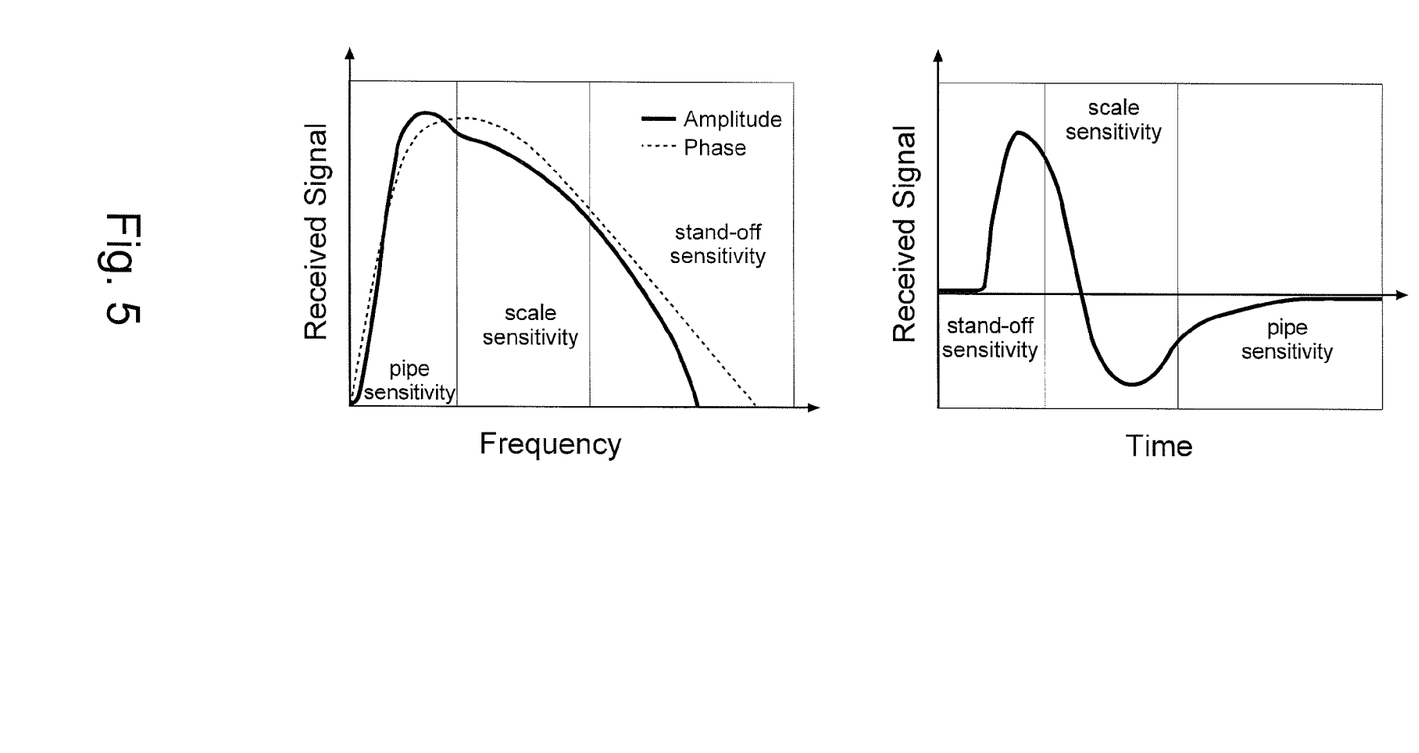
FIG. 5 is a diagram illustrating the pipe and scale sensitivity ranges for conformable sensor measurements in both time and frequency domains, according to aspects of the present disclosure.

In certain embodiments, due to differences in material properties of scale and pipe, different type and frequencies of signals can be generated by the transmitters to better measure the pipe and scale. FIG. 5 is a diagram illustrating the pipe and scale sensitivity ranges for conformable sensor measurements in both time and frequency domains, according to aspects of the present disclosure. In the frequency domain, signals with lower frequencies can penetrate through a pipe surface and can sense pipe electrical parameters such as conductivity, dielectric constant and magnetic permeability. Signals with higher frequencies, in contrast, cannot penetrate pipe, but are sensitive to scale properties. If the frequency of the signal is above certain value, the signal will be reflected back from scale surface, but will provide information regarding the stand-off distance between the sensor and the pipe.

The signal in the frequency domain may be represented as a phasor with amplitude and phase, or as real and imaginary parts of complex voltages or currents. An example frequency range of excitation is 0.1 Hz to 10 THz. Because the signal levels may be small at very low frequencies (the signal level is proportional to frequency at a low frequency limit), and the small at high frequencies (due to losses in fluid or gas in the stand-off region), the ideal excitation may generate signals between these two extremes. In time-domain, early time responses may be an indication of stand-off since the pulses have not penetrated through the scale or pipe yet. Later time responses may be first indicative of scale, and then indicative of the pipe. One advantage of time-domain measurement is that a higher dynamic range and lower noise measurement can be done since listening is conducted when the transmitter is not operating. In both frequency- and time-domain, however, the responses from the stand-off, scale and pipe cannot be easily separated and mapped to material properties due to complex interactions of EM fields with materials. Accordingly, the measurements may be captured and processed to resolve the different measurements and separate separately image scale and pipe features.

Figure 6:
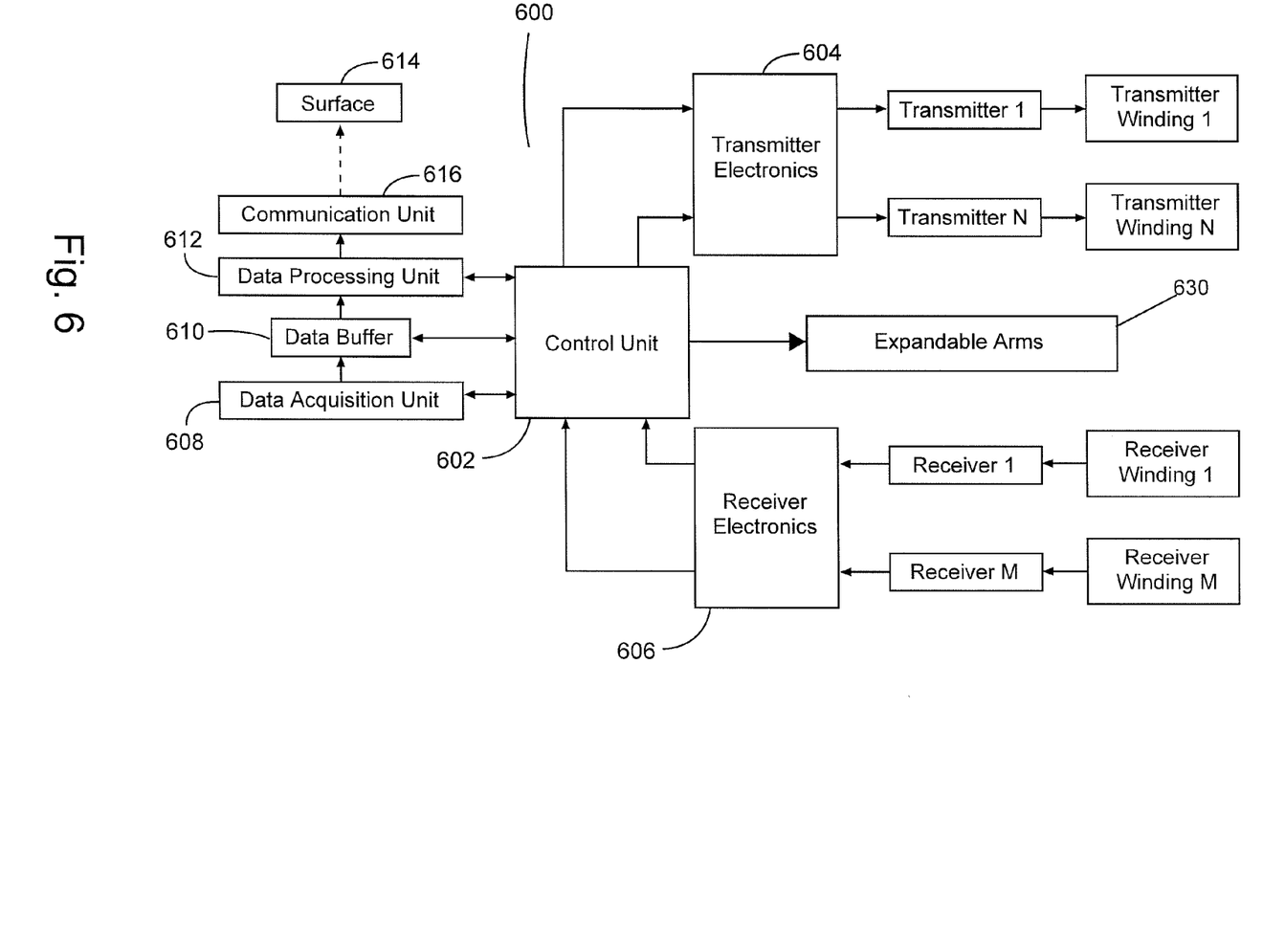
FIG. 6 is an example control system for a downhole tool with conformable sensors, according to aspects of the present disclosure.

In certain embodiments, a control system associated with the downhole tool may control when and how the conformable sensors capture measurements regarding the scale and pipes, including the combinations of transmitters and receivers used to make measurements and the frequencies of the generated EM fields. FIG. 6 is a diagram showing an example control system 600 for a downhole tool with conformable sensors, according to aspects of the present disclosure. The system 600 comprises a control unit 602 that may function as the primary controller for the tool and may be communicably coupled to transmitters 1-N through transmitter electronics 604, to receivers 1-M through receiver electronics 306, and to mechanical, electrical or hydraulic elements 630 coupled to and configured to extend pads to which the transmitters 1-N and receivers 1-M coupled. Other mechanical, electrical, or hydraulic element of the tool may also be coupled to the control unit 602. At least one of the transmitters 1-N and receivers 1-M may comprise elements of a conformable sensor or an array of conformable sensors. The transmitter electronics 604 and receiver electronics 606 may comprise circuit boards to which some or all of the transmitters 1-N and receivers 1-M are coupled.

The control unit 602 may trigger the transmitter electronics 604 to generate a time-varying signal through one or more of the transmitters 1-N. The time-varying signal may be a sinusoidal signal, its phase and amplitude set at a desired value. As is described above, the signals generated through the transmitters 1-N may be coupled to and generate eddy currents in the scale and pipe that are in immediate contact with the conformable sensors, and the eddy currents may generate secondary currents that contain information about the scale and pipe. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 602 may receive the measurements from the receivers 1-N through the receiver electronics 606 and may transmit the measurements to the data acquisition unit 608. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 608, the measurements may be digitized, stored in a data buffer 610, preprocessed at data processing unit 612, and sent to the surface 614 through a communication unit 616, which may comprise a downhole telemetry system.

In certain embodiments, the control system 600, and in particular the control unit 602 may be responsible for controlling the pairs of transmitters and receivers that generate measurements and the signal types and frequencies of transmitter signals to fully measure and model the scale and the pipe surrounding the downhole tool. The control unit 602 may comprise a set of instructions and may generate control signals to the transmitter and receiver electronics based, at least in part, on the instructions. The control signals to the transmitters, or to the transmitter electronics, for example, may indicate a transmitter to generate an EM signal and the frequency of the EM signal to be generated by the transmitter. The control unit 302 further may issue control signals to the transmitter and receivers to take different types of measurements within certain time periods. Example types of measurements include measurements with low-depth of investigations, medium depth of investigation, and high depth of investigation.

According to aspects of the present disclosure, the measurements from the conformable sensors of the downhole tool may be aggregated and processed to produce a visualization of the pipes, scale, and/or corrosion surveyed or measured by the downhole tool. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. In certain embodiments, aggregating and processing the measurements may comprise aggregating and processing the measurements using an inversion algorithm implemented as a set of instructions in the control unit that are executable by a processor of the control unit to perform data calculations and manipulations necessary for the inversion algorithm. The inversion algorithm may be specific to the environment in which the downhole tool is used (cased or open hole) and may be designed to calculate downhole parameters unique to the environment.

Figure 7:
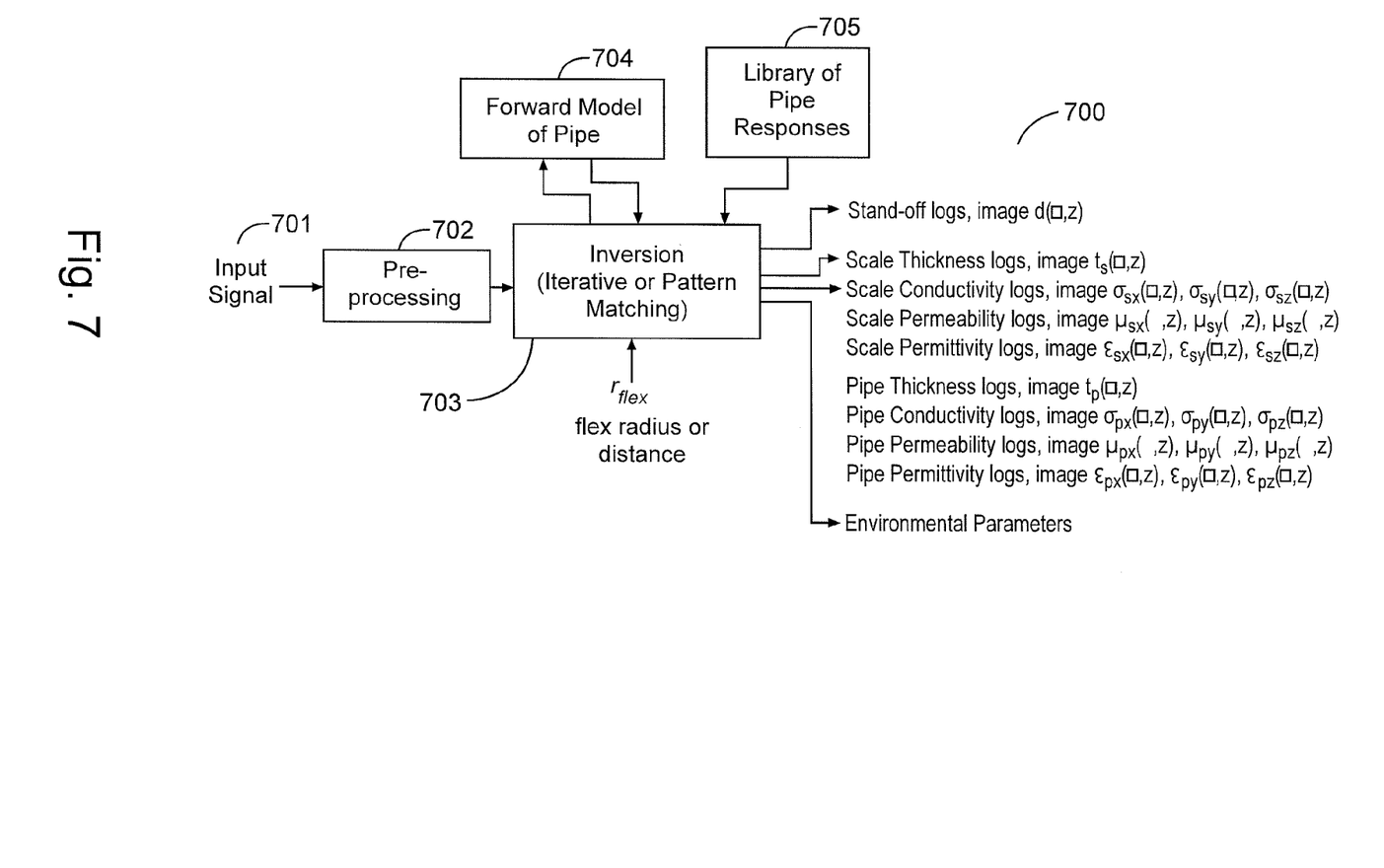
FIG. 7 is a block diagram showing an example inversion algorithm, according to aspects of the present disclosure.

FIG. 7 is a block diagram on an example inversion algorithm 700 for a cased environment with one or more casings, according to aspects of the present disclosure. An input signals 701 may comprise the measurements from the receivers of the downhole tool, including the receivers of the conformable sensor. The inversion algorithm may comprise a pre-processing block 702, which may receive the input signals 701. The pre-processing block 702 may process the input signals to compensate for downhole conditions or to convert the input signals to a form usable within the inversion block 703. For example, the pre-processing block 702 may process the measurements to calibrate for temperature effects, convert between frequency to time domain, convert between complex-value to phase and amplitudes, and/or to remove noise by filtering in azimuth or depth.

The inversion algorithm further may comprise an inversion block 703, which may receive and process the signals from the pre-processing block 702 to identify scale and casing parameters. In certain embodiments, the inversion block 703 may receive a model 704 of scale and casing. The inversion block 703 may implement a cost function to identify scale and casing parameters that produce the minimum mismatch between the model 704 and the input signal 701. The cost function may be defined, for example, by utilizing least squares minimization through $L_2$ norm. The inversion block 703 may output data on one or more parameters of the casings.

In certain embodiments, a library 705 of scale and casing responses from other conformable sensors measurements that can be used instead of or in addition to the model 704. For example, the library 705 may be used if the parameter dimensions of the scale and casing responses are low in number and also small in range, so that an accurate library can be calculated. If library 705 is used, a multi-dimensional interpolation can be used to obtain the parameters of the casing closest to the measurements.

The inversion block 703 may generate output including one or more parameters of the scale and casing measured by the downhole tool. Example parameters include scale and casing thickness, conductivity ($\sigma$), permeability ($\mu$), and permittivity ($\epsilon$). In the case where tool body transmitters and receivers are used, information on multiple casings may be recovered (pipe index shown as i in the figure). In certain embodiments the inversion block 703 may output logs of the parameters that may produce visualizations of the scale and casing through which corrosion of crack in the casing can be identified. Because of the resolution offered by conformable sensors, very small scale and casing features (on the order of 0.1 inches) can be imaged on the casing in direct contact with the conformable sensor. Notably, by imaging the scale and casing using the parameters, the size and shape of the scale may be characterized by identifying variations in the scale parameters. Additionally, features of the casing, such as corrosion, may be determined and characterized by identifying variation in the casing parameters.

Figure 8:
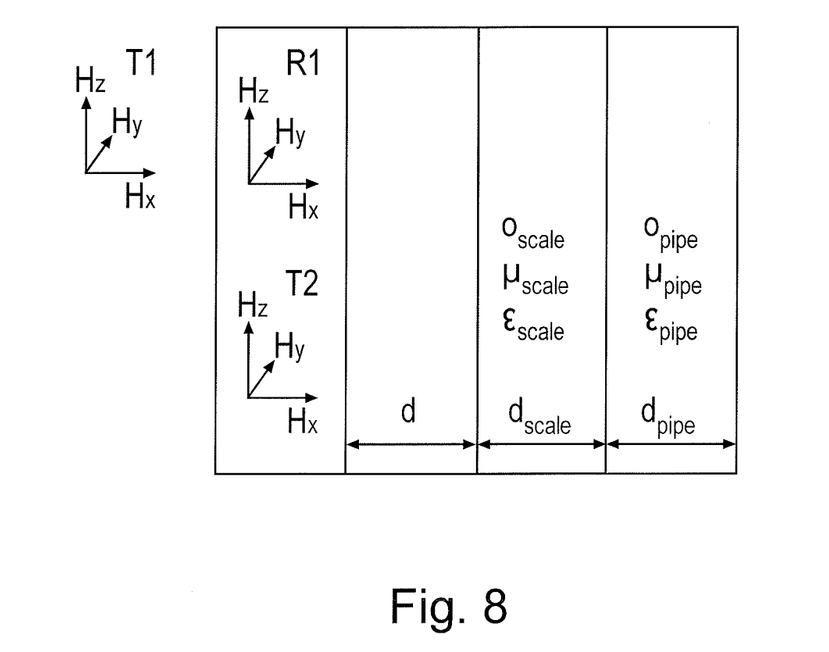
FIG. 8 is an example scale and casing model for an inversion algorithm, according to aspects of the present disclosure.

FIG. 8 is a diagram showing an example scale and casing model that may be used in conjunction with an inversion algorithm, according to aspects of the present. The model comprises a one-dimensional layer model where each layer boundary is parallel to each other is used. This may allow computationally efficient modeling by using analytical expressions instead of time consuming finite difference, finite element, finite volume, method of moments or integral equation based numerical solutions. T1 corresponds to the transmitters or receivers on the tool body, and T2 and R2 may correspond to the transmitter and receivers of a conformable sensor in contact with the scale and casing. The value d may correspond to the stand-off distance between the scale and the conformable sensor, with $d_{scale}$ and $d_{pipe}$ corresponding to the thickness of the scale and the casing, respectively. The conductivity, magnetic permeability and electric permittivity of the scale and casing may also be considered.

Figures 9, 10:
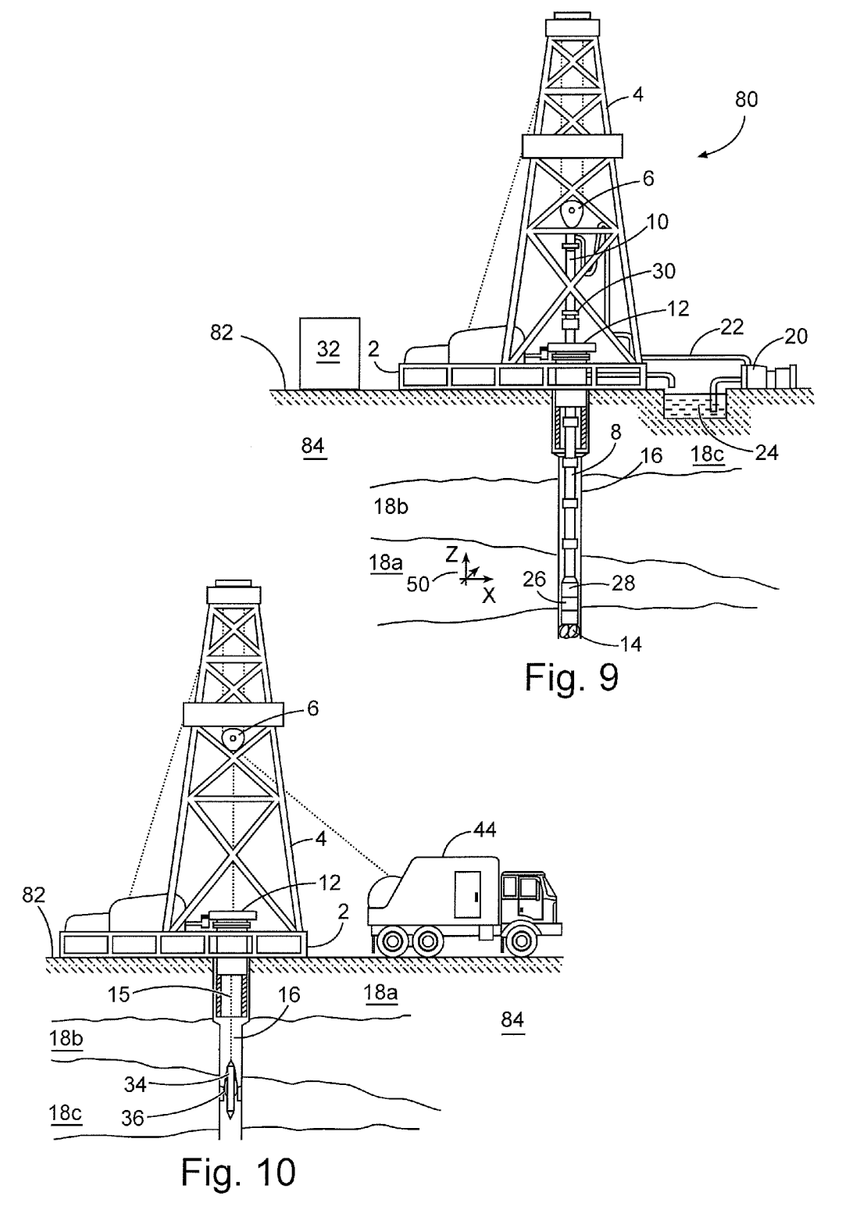
FIG. 9 is a diagram showing an illustrative logging while drilling environment, according to aspects of the present disclosure.
FIG. 10 is a diagram showing an illustrative wireline logging environment, according to aspects of the present disclosure.

FIG. 9 is a diagram showing a subterranean drilling system 80 incorporating a downhole tool 26 with at least one conformable sensor, similar to the example downhole tools described above. The drilling system 80 comprises a drilling platform 2 positioned at the surface 82. In the embodiment shown, the surface 82 comprises the top of a formation 84 containing one or more rock strata or layers 18*a-c*, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with at least one conformable sensor. As the bit extends the borehole 16 through the formations 18, the tool 26 may collect measurements relating to borehole 16 and the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

At various times during the drilling process, the drill string 8 may be removed from the borehole 16 as shown in FIG. 10. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise a downhole tool 36 with at least one conformable sensor, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

According to aspects of the present disclosure, an example method for making downhole measurements may include positioning a tool with a conformable sensor within a pipe in a borehole in a subterranean formation, and generating a first electromagnetic signal using at least one of a plurality of transmitters of the conformable sensor. A first response to the first electromagnetic signal may be measured using at least one of a plurality of receivers of the conformable sensor. At least one of a scale parameter, a pipe parameter, and a stand-off distance between the conformable sensor and the pipe may be determined using the first response.

In certain embodiments, the first response corresponds to a first pair of the plurality or transmitters and the plurality of the receivers. In certain embodiments, the method may further comprise generating a second electromagnetic signal using at least one of the plurality of transmitters, and measuring a second response to the second electromagnetic signal using at least one of the plurality of receivers. In certain embodiments, the second response corresponds to a second pair of the plurality or transmitters and the plurality of the receivers. In certain embodiments, the second electromagnetic signal comprises a different frequency than the first electromagnetic signal. In certain embodiments, determining at least one of the scale parameter, the pipe parameter, and the stand-off distance between the conformable sensor and the pipe using the first response comprises determining at least one of the scale parameter, the pipe parameter, and the stand-off distance between the conformable sensor and the pipe using the first response and the second response.

In any of the embodiments described in the preceding two paragraphs, the method may further comprise determining a pipe parameter for an other pipe concentric with and outside of the pipe based, at least in part, on the first response and the second response. In any of the embodiments described in the preceding two paragraphs, positioning the tool with the conformable sensor within the pipe in the borehole may comprise extending a pad from the tool, the conformable sensor being coupled to the pad. In any of the embodiments described in the preceding two paragraphs, the scale and pipe parameters may comprise at least one thickness, conductivity, permeability, and permittivity. In any of the embodiments described in the preceding two paragraphs, positioning the tool within the pipe in the borehole may comprise one of positioning the tool within the pipe using a drill string coupled to the tool and positioning the tool within the pipe using a wireline or slickline coupled to the tool.

According to aspects of the present disclosure, an example system for making downhole measurement may include a downhole tool and a conformable sensor coupled to the downhole tool, the conformable sensor comprising a flexible material, a plurality of transmitters coupled to the flexible material, and a plurality of receivers coupled to the flexible material. The system may further include a control unit comprising a processor and a memory device coupled to the processor, the memory device containing a set of instructions that, when executed by the processor, cause the processor to generate a first electromagnetic signal using at least one of the plurality of transmitters, measure a first response to the first electromagnetic signal using at least one of the plurality of receivers, and determine at least one of a scale parameter, a pipe parameter, and a stand-off distance between the conformable sensor and the pipe using the first response.

In certain embodiments, the first response corresponds to a first pair of the plurality of transmitters and the plurality of the receivers. In certain embodiments, the set of instructions further causes the processor to generate a second electromagnetic signal using at least one of the plurality of transmitters; and measure a second response to the second electromagnetic signal using at least one of the plurality of receivers. In certain embodiments, the second response may correspond to a second pair of the plurality or transmitters and the plurality of the receivers. In certain embodiments, the second electromagnetic signal may comprise a different frequency than the first electromagnetic signal. In certain embodiments, the set of instructions that causes the processor to determine at least one of the scale parameter, the pipe parameter, and the stand-off distance between the conformable sensor and the pipe using the first response further may cause the processor to determine at least one of the scale parameter, the pipe parameter, and the stand-off distance between the conformable sensor and the pipe using the first response and the second response.

In any of the embodiments described in the preceding two paragraphs, the set of instructions may further causes the processor to determine a pipe parameter for an other pipe concentric with and outside of the pipe based, at least in part, on the first response and the second response. In any of the embodiments described in the preceding two paragraphs, the conformable sensor may be coupled to a pad extendable from the downhole tool. In any of the embodiments described in the preceding two paragraphs, the scale and pipe parameters may comprise at least one thickness, conductivity, permeability, and permittivity. In any of the embodiments described in the preceding two paragraphs, the downhole tool may comprise one of a logging-while-drilling tool and a wireline tool.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for making downhole measurement, comprising:
   positioning a tool with a conformable sensor within a pipe in a borehole in a subterranean formation, wherein the conformable sensor is disposed on a material that conforms to a surface of the tool, wherein positioning the tool with the conformable sensor within the pipe in the borehole comprises extending a pad from the tool, the conformable sensor being coupled to the pad body such that the conformable sensor contacts the pipe by deforming to a shape of the pipe;
   generating a first electromagnetic signal using at least one of a plurality of transmitters of the conformable sensor;
   measuring a first response to the first electromagnetic signal using at least one of a plurality of receivers of the conformable sensor; and
   determining at least one of a scale parameter, a pipe parameter, and a stand-off distance between the conformable sensor and the pipe using the first response.

2. The method of claim 1, wherein the first response corresponds to a first pair of the plurality of transmitters and the plurality of the receivers.

3. The method of claim 2, further comprising
   generating a second electromagnetic signal using at least one of the plurality of transmitters; and
   measuring a second response to the second electromagnetic signal using at least one of the plurality of receivers.

4. The method of claim 3, wherein the second response corresponds to a second pair of the plurality of transmitters and the plurality of the receivers.

5. The method of claim 3, wherein the second electromagnetic signal comprises a different frequency than the first electromagnetic signal.

6. The method claim 5, wherein determining at least one of the scale parameter, the pipe parameter, and the stand-off distance between the conformable sensor and the pipe using the first response comprises determining at least one of the scale parameter, the pipe parameter, and the stand-off distance between the conformable sensor and the pipe using the first response and the second response.

7. The method of claim 3, further comprising determining a pipe parameter for an other pipe concentric with and outside of the pipe based, at least in part, on the first response and the second response.

8. The method of claim 1, wherein the scale and pipe parameters comprise at least one thickness, conductivity, permeability, and permittivity.

9. The method of claim 1, wherein positioning the tool within the pipe in the borehole comprises one of positioning the tool within the pipe using a drill string coupled to the tool and positioning the tool within the pipe using a wireline or slickline coupled to the tool.

10. A system for making downhole measurement, comprising:
    a downhole tool disposed within a pipe;
    an extendable arm coupled to the downhole tool;
    a pad coupled to the extendable arm;
    a conformable sensor coupled to the pad of the extendable arm of the downhole tool, wherein the conformable sensor deforms to a shape of the pipe based on a tension of the extendable arm, and wherein the conformable sensor comprises:

a flexible material that conforms to a surface of the downhole tool;
a plurality of transmitters coupled to the flexible material; and
a plurality of receivers coupled to the flexible material;
a control unit comprising a processor and a memory device coupled to the processor, the memory device containing a set of instructions that, when executed by the processor, cause the processor to
generate a first electromagnetic signal using at least one of the plurality of transmitters;
measure a first response to the first electromagnetic signal using at least one of the plurality of receivers; and
determine at least one of a scale parameter, a pipe parameter, and a stand-off distance between the conformable sensor and the pipe using the first response.

11. The system of claim 10, wherein the first response corresponds to a first pair of the plurality of transmitters and the plurality of the receivers.

12. The system of claim 11, wherein the set of instructions further causes the processor to
generate a second electromagnetic signal using at least one of the plurality of transmitters; and
measure a second response to the second electromagnetic signal using at least one of the plurality of receivers.

13. The system of claim 12, wherein the second response corresponds to a second pair of the plurality of transmitters and the plurality of the receivers.

14. The system of claim 12, wherein the second electromagnetic signal comprises a different frequency than the first electromagnetic signal.

15. The system claim 14, wherein the set of instructions that causes the processor to determine at least one of the scale parameter, the pipe parameter, and the stand-off distance between the conformable sensor and the pipe using the first response further causes the processor to determine at least one of the scale parameter, the pipe parameter, and the stand-off distance between the conformable sensor and the pipe using the first response and the second response.

16. The system of claim 12, wherein the set of instructions further causes the processor to determine a pipe parameter for an other pipe concentric with and outside of the pipe based, at least in part, on the first response and the second response.

17. The system of claim 10, wherein the scale and pipe parameters comprise at least one thickness, conductivity, permeability, and permittivity.

18. The system of claim 10, wherein downhole tool comprises one of a logging-while-drilling tool and a wireline tool.

* * * * *